United States Patent [19]

Juengel

[11] Patent Number: 4,742,470

[45] Date of Patent: May 3, 1988

[54] TOOL IDENTIFICATION SYSTEM

[75] Inventor: Richard O. Juengel, Romeo, Mich.

[73] Assignee: GTE Valeron Corporation, Troy, Mich.

[21] Appl. No.: 890,187

[22] Filed: Jul. 25, 1986

Related U.S. Application Data

[63] Continuation-in-part of Ser. No. 814,464, Dec. 30, 1985.

[51] Int. Cl.$^4$ .................. G06F 15/46; H04Q 9/00; H04L 7/06
[52] U.S. Cl. ..................... 364/474; 29/568; 340/870.13; 340/870.32; 340/870.37; 340/825.23; 340/825.54; 340/825.72; 340/680; 375/113; 375/45
[58] Field of Search ............... 364/474, 475; 340/870.31, 870.32, 870.37, 870.42, 825.06, 825.15, 825.23, 825.54, 825.72, 680, 870.13; 455/603, 606, 607; 318/16; 29/563, 568; 375/113, 111, 45; 342/42

[56] References Cited

U.S. PATENT DOCUMENTS

| Re. 27,810 | 11/1973 | Buehrle | 375/113 |
|---|---|---|---|
| 3,303,701 | 2/1967 | Matsuura et al. | 340/870.37 |
| 3,689,885 | 9/1972 | Kaplan | 340/825.34 |
| 3,713,143 | 1/1973 | Cardullo et al. | 342/42 |
| 4,011,551 | 3/1977 | Adler | 340/870.28 |
| 4,014,003 | 3/1977 | Beckman | 340/825.06 |
| 4,242,666 | 12/1980 | Reschovsky | 340/870.28 |
| 4,328,623 | 5/1982 | Juengel et al. | 33/174 L |
| 4,364,043 | 12/1982 | Cole et al. | 340/825.54 |
| 4,497,029 | 1/1985 | Kiyokawa | 364/170 |
| 4,509,170 | 4/1985 | Hollinger et al. | 340/870.13 |
| 4,545,106 | 10/1985 | Juengel | 29/563 |
| 4,588,880 | 5/1986 | Hesser | 340/825.23 |

FOREIGN PATENT DOCUMENTS

WO85/03831 8/1985 PCT Int'l Appl. .

OTHER PUBLICATIONS

2 page document from Hertel International.
Catalogue number 516 E from Balluff Inc. (12 pages).
Catalogue number 508 E from Balluff Inc. (8 pages).
14 page brochure entitled "Bilz Tool Dialog System" and English translation thereof.

*Primary Examiner*—Michael R. Fleming
*Assistant Examiner*—John R. Lastova
*Attorney, Agent, or Firm*—Harness, Dickey & Pierce

[57] ABSTRACT

Provision is made for identifying tools used in an automated machine tool system. A module or transponder is mounted to the tool and interrogated by a transceiver which, in the preferred embodiments, has read/write capabilities. The transponder uses energy from the transmitted signal to power itself and send information stored in its memory back to the transceiver. In one embodiment, electromagnetic energy is transmitted from the transceiver to the transponder while the transponder to transceiver communication link is provided by way of capacitive coupling.

11 Claims, 7 Drawing Sheets

TOOL IDENTIFICATION SYSTEM

CROSS REFERENCE TO RELATED APPLICATIONS

This application is a continuation-in-part of U.S. patent application Ser. No. 814,464 filed Dec. 30, 1985 by Richard O. Juengel entitled "Passive Data Storage and Identification".

FIELD OF THE INVENTION

This invention relates generally to machine tools and more specifically to data storage and tool identification apparatus for use with a numerically controlled machine tool, having wireless transmission of the tool data to and from a computer controlled receiving unit.

BACKGROUND OF THE INVENTION

In order to perform the variety of machining operations required to be performed on a workpiece the computer numerically controlled (CNC) machine has access to a tool storage magazine containing the required tools. All of these tools are mounted on an industry standard shank which can be placed in the machine spindle automatically by the machine.

This diversity of tooling allows the machine to be programmed to produce a very wide variety of parts, or very complex parts without any need for machine operator intervention.

A further improvement of such a manufacturing concept is the Flexible Manufacturing System (FMS). In such an application a cell consists of several unmanned machines. In this application, not only can the machines select their own tools, but the machines can exchange or share tools between themselves.

As is well known cutting tools have a finite life span after which they must be reconditioned. Thus it would be desirable to know the amount of use each tool has received.

Further even after reconditioning a tool though perfectly suited for a particular operation may not be of an optimum dimension for which a machine is programmed thus requiring an offset.

In such a situation it would be desirable for the machine receiving a particular tool to be able to positively identity it as a modified correct tool for the operation to be performed whereby the machine can itself provide the required offset.

SUMMARY OF THE INVENTION

The present invention provides a more flexible and economically efficient improvement over currently known tool control arrangements.

It provides the ability to locate data indicative of a tools identify, type, size of offset and condition with a particular tool, which can then be read and transmitted to a data receiving device.

The present invention provides an electronic implant within the cutting tool for storing the pertinent data and which requires no co-located batteries for its operation.

The apparatus includes a transmitter for communicating a signal for transmission outside of the implant. This transmitter includes an arrangement activated from outside the implant for causing the transmitter to change from a quivescent state of no power consumption to a power utilizing transmitting and receiving state.

A particularly advantageous design is disclosed in connection with one embodiment of this invention that also finds broad utility even outside the machine tool environment. Briefly, the identification system includes a transceiver having first means for transmitting an electromagnetic signal and second means for receiving an electrostatic signal. A transponder includes a memory and first means for receiving the electromagnetic signal from the transceiver. The electromagnetic signal is then used to supply power to the memory. The transponder also includes second means that is capacitively coupled to the second means in the transceiver. The second means in the transponder is used to transmit an electrostatic signal associated with information stored in the memory back to the transceiver.

DESCRIPTION OF THE DRAWING

These and other objects and features of the invention will become apparent from a reading of the detailed description of a preferred embodiment taken in conjunction with the drawings comprising.

DESCRIPTION OF THE PREFERRED EMBODIMENT

Figure 1:
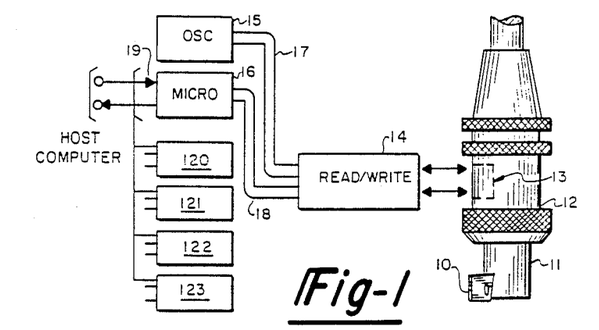
FIG. 1 is a block diagram showing a tool having a memory implant and a number of control devices chained together for connection to a master processer.

In order to better gain an understanding of the invention, the basic components of the invention and their interconnections with one another are shown on FIG. 1. Wherein a cutting bit 10 is shown mounted on the tool holder shank 11 which is mounted in the tool holder body 12.

An electronic module 13 containing a memory along with the data transmitting and receiving facilities is shown mounted within the tool holder body 12.

A box 14 representing the power and data transmitting and receiving facility is shown facing the tool holder. This is normally positioned on a computer numerically controlled (CNC) machine near the tool pickup station from which the machine selects the tools for its subsequent machining operation. The read-write facility 14 is cabled via cable 17 to an alternating current source 15 from which it receives the power for supplying to its module 13 and also to the box labeled 16 via cable 18 which may be an interface micro-computer supplying data to the module 13 via the read-write facility 14 as well as receiving data from the module 13. The interface micro-processor 210 may be of the type MC68705 manufactured by Motorola Semiconductor Products and described in the 1984 Edition of the Catalog and Selection Guide.

The micro-computer may be chained via cable 19 to a number of other micro-computers such as those labeled 120, 121 and 122 to a host computer 123.

Figure 2:
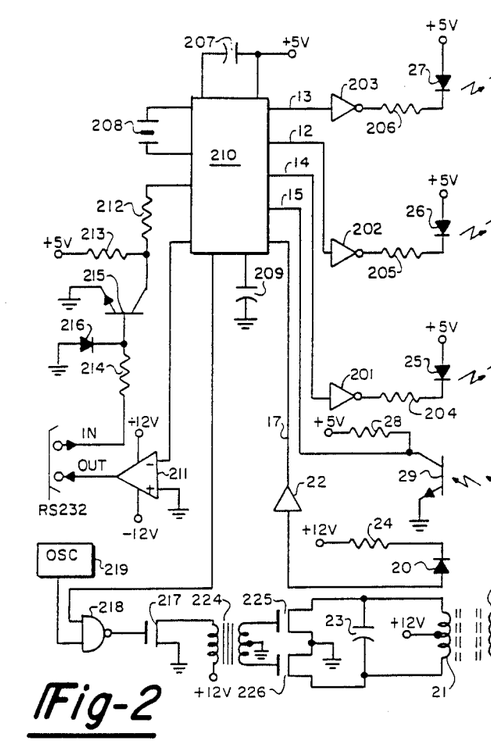
FIG. 2 is a simplified schematic of an individual control device.
Figure 3:
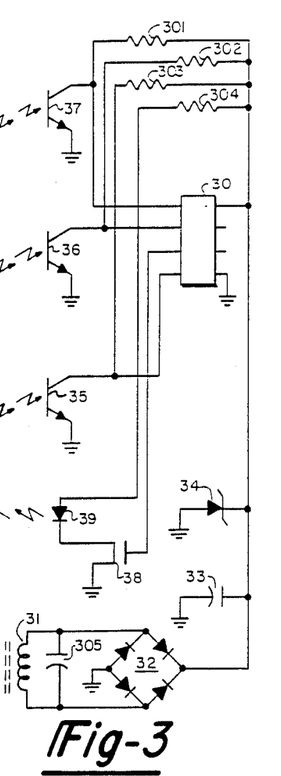
FIG. 3 is a schematic of the circuit of the memory inplant that is located in the machine tool.
Figure 4:
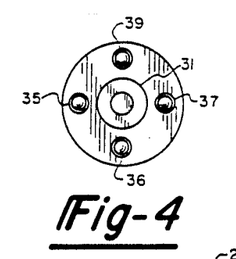
FIG. 4 is a plan view of the memory implant.
Figure 5:
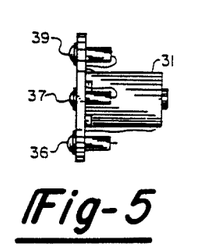
FIG. 5 is a side sectional view of the memory implant.

FIGS. 2 and 3 shows in schematic form the contents of read-write head 14 and associated circuits and the data module 13. The data module 13 as shown on FIGS. 3, 4 and 5 includes a memory chip 30 which may be a National Semiconductor type NMC 9346 E which is a 1024 bit serial electrically erasable programmable memory. This memory is capable of retaining its programmed contents through the intervals when the operating power is not present. The power for operation of this circuit is supplied from a coil 31 which is magnetically coupled to a supply coil 21 driven by an alternating current source. The coupled energy received at coil 31 with its resonating capacitor 305 is rectified at a diode bridge 32 and filtered by capacitor 33. A zener diode 34 serves to maintain the rectifier output voltage at a constant level.

Information is received for input data and controlling the memory 30 via three photo transistors 35, 36, and 37 for the data input, clock frequency input and for the memory select respectively.

Figure 6:
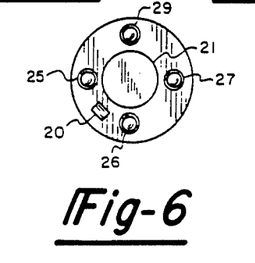
FIG. 6. is a plan view of the Read/Write head.

A light emitting diode 39 is used to transmit data read out of the memory 30, which data is amplified by a field effect transistor 38. Resistors 301, 302, 303 and 304 control the current to the photo transistor and light emitting diode. Circuit details of the read write head 14 are shown on FIG. 2 and a component layout of the face is shown on FIG. 6. The light emitting diodes 25, 26 and 27 are used for transmitting signals to the corresponding photo transistors 35, 36 and 37 of FIG. 3. These diodes are connected from a +5 V at a first terminal of each and then through a current limiting resistor such as resistors 201, 202 and 203 and drive amplifiers 204, 205, and 206 to the respective terminals for connection to the control interface computer 210 corresponding to that labeled 16 of FIG. 1.

A photo transistor 29 biased via a resistor 28 to a +5 V is included for receiving any data transmitted by the light emitting diode 39 of FIG. 3. Its collector output is shown connected to the interface computer 210. The emitter of transistor 29 is connected to ground potential.

A ferrite core Coil 21 shown with the center tap of the primary winding connected to a positive 12 V source is the means by which power is transmitted to the electronic module of the tool holder. The coil 21 is shown with the outer terminals connected to the power amplifier consisting of two field effect transistors 225 and 226 connected in pushpull. The transistors are driven by a coupling transformer. An oscillator 219 has its output via a gate 218 which is controlled from the computer 210. The output of gate 218 is amplified at transistor 217 which in turn is connected to the primary widing of coupling transformer 224. A resonating capacitor 23 is connected across the outside coil terminals. Another item mounted within the read-write head is a PIN light sensitive diode 20. Its cathode is connected via a resistor 24 to a positive 12 V., and its anode via an amplifier 22 to a terminal for connection to the interface computer 210.

This diode provides the ability to detect when a data module is in position to be read. This is done by modulating all three LED's on the R/W head on and off at a very fast rate (about 2 KHz). The PIN diode detector 24) receives this light if there is something close to the R/W head which reflects back the 2 KHz modulated infrared light. When something reflective is sensed, the microprocessor turns on the oscillator 219 and sends the proper signals to the data module to attempt to read it. If it receives valid data back from the module, it signals the machine controller that it has data for it, and waits for further instructions.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

Figure 7:
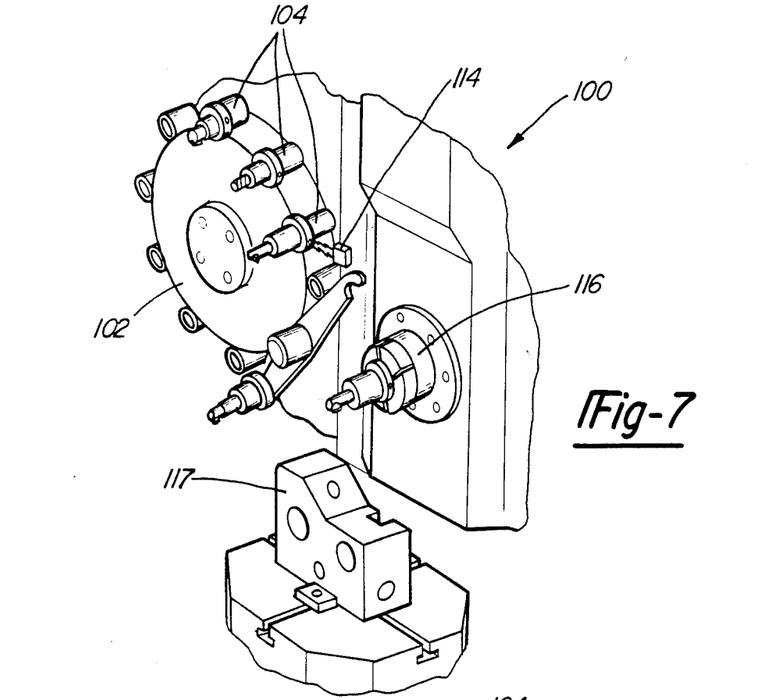
FIG. 7 is a view which shows a typical machine tool environment in which the present invention finds particular utility.

In FIG. 7, there is shown an example of a CNC machine tool system 100 that incorporates a tool storage mechanism in the form of a rotating drum or magazine 102 containing a plurality of tools 104. In this embodiment the tools 104 each include an adapter portion 106 having a tool bit 108 conventionally mounted thereto (see FIG. 8). Adapter 106 includes a drive key slot 110 where the transponder 112 is mounted. The transponder 112 has alternately been referred to herein as an implant or module. Referring back to FIG. 7, a transceiver 114 in the form of a read/write head is fixedly mounted on machine 100. Transceiver 114 is located so that it is in operable position to read and write information into the memory of the transponder 112 contained in one of the tools 104. This is conveniently done by locating transceiver 114 adjacent to the station in magazine 102 from which a tool to be used is loaded into the machine spindle 116. There are a variety of different tool changing mechanisms known in the art and therefore, the position of the read/write head or transceiver 114 will vary depending upon the particular construction of the machine tool. Preferably, however, transceiver 114 is located in a position so that it can read information from the tool transponder memory before the tool is loaded into the machine spindle and in a position so that it can write information, if desired, into the tool transponder memory after the tool has been removed from the machine spindle.

As noted above, some of the advantages of this approach include the positive identification of the tool by the machine controller before the tool is actually used to perform a machining operation on the workpiece 117, i.e., to remove metal therefrom. Tool parameters such as maximum feed and speed can be stored in the memory of the transponder 112 which can be read by the transceiver 114 prior to use. Thus, the job of the machine programmers can be made easier since this information need not be part of the program used to control the CNC machine operation. In other words, it is carried by the tool instead of in the computer program. Another advantage is that tool point offsets can be stored within the tool and used to correct the machine so that it can produce more accurate parts. In addition, the maximum expected life of a tool can be initially stored in the transponder memory and decreased each time the tool is used by the machine to thereby provide a running count of the remaining life of the tool. Various other advantages will become apparent to those skilled in the art upon a study of the drawings and specification contained herein.

The foregoing description has equal applicability to both embodiments described in this application. The former embodiment described in connection with FIGS. 1–6 can be even further improved as will be discussed in connection with FIGS. 9–13.

Figures 8, 9, 10:
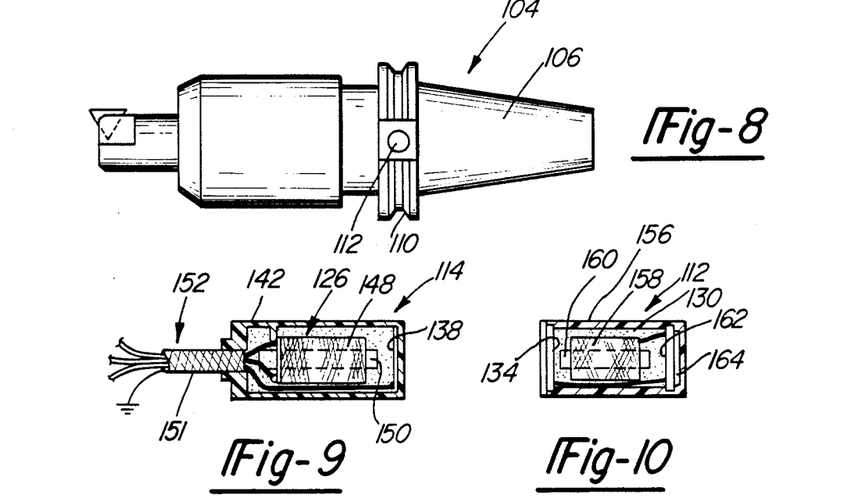
FIG. 8 is a side view of a tool including an adapter portion and a bit, with the module or transponder being shown mounted within the drive key of the adapter.
FIG. 9 is a cross-sectional view of a transceiver or read/write head made in accordance with the teachings of one embodiment of this invention.
FIG. 10 is a side cross-sectional view of the implanted module or transponder made in accordance with the teachings of one embodiment of this invention.
Figure 11:
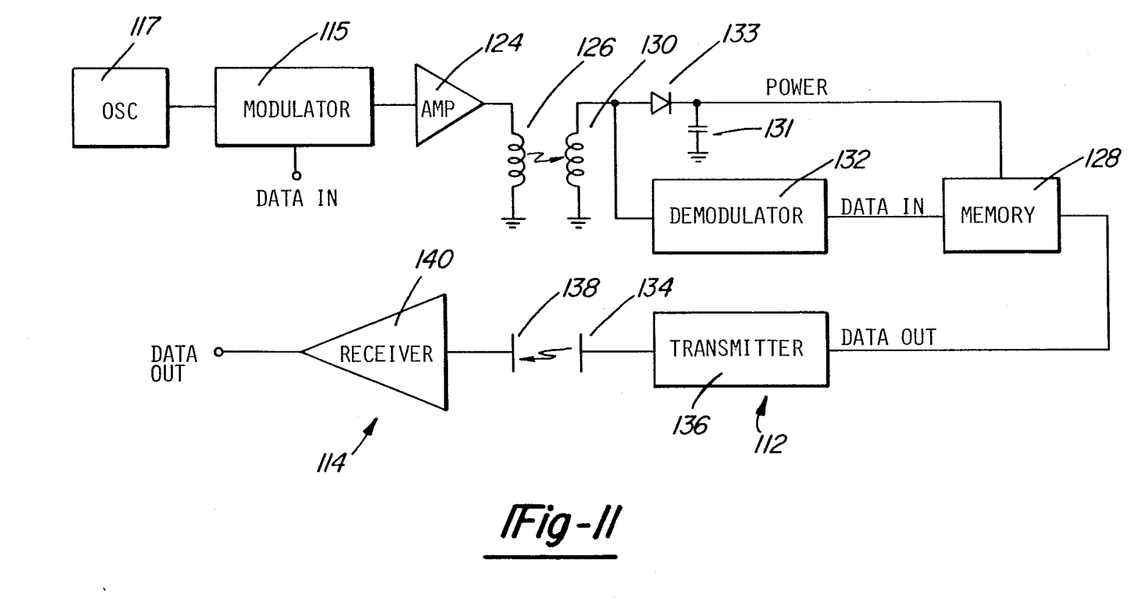
FIG. 11 is a generalized block diagram illustrating the functions carried out by the transceiver and transponder according to the broad teachings of the present invention.

Turning then to these drawing figures and beginning with FIGS. 9–11, the alternate embodiment employs a transceiver-transponder construction that employs a unique combination of electromagnetic and electrostatic couplings for use in transmitting information back and forth between the transceiver and transponder. As shown diagrammatically in FIG. 11, the transceiver uses a modulator 115 to modulate a reference frequency provided by oscillator 117 in accordance with input signals labeled "data in" which can be supplied from the machine controller or microprocessor such as microprocessor 16 in the FIG. 1 embodiment. The modulated signal is amplified by way of amplifier 124 and supplied to an inductor 126. Inductor 126 thus transmits an encoded electromagnetic signal that contains: (1) sufficient energy to power the circuitry in the transponder 112 and (2) sufficient data or control signals required to operate the electronic components contained within the transponder 112. For simplicity's sake, these signals will be referred to as simply "data in" signals and they include such things as clock signals, chip select signals and other operational or op codes known by those skilled in the art as being required to operate electrical components such as the electrically erasable programmable memory 128 contained within the transponder 112. A suitable memory is the serial electrical erasable programmable memory available from National Semiconductor as component No. NMC9346E/COP395. The required data signals to read, write and erase such a memory is set forth in National Semiconductor's trade literature which is available to the public and is hereby incorporated by reference.

Thus, the power and data in signals are provided by an electromagnetic coupling between the inductor 126 in the transceiver 114 and the inductor 130 in the transponder 112. The electromagnetic energy induced in inductor 130 is filtered (represented by capacitor 131) and rectified (as represented by diode 133) to provide the required power for the internal transponder electronic components which include a demodulator 132. Demodulator 132 operates to demodulate the encoded data in signals and supply them to the memory 128 to perform whatever operation is desired such as writing or reading information from memory 128. Typically, an identification code will be preprogrammed into the memory 128 to provide a unique identification code or tag for each tool 104. To read the data out of memory 128, the appropriate read commands will be generated from the transceiver controller, transmitted electromagnetically via inductor 126 thereby causing the memory 128 to generate data out signals corresponding to information stored in appropriately addressed locations in the memory 128.

Pursuant to an important feature of this invention, the "data out" information from memory 128 is transmitted electrostatically, as compared to electromagnetically, back to transceiver 114. In FIG. 11, this capacitive coupling is shown diagrammatically by one capacitor plate 134 connected to suitable transmitting circuitry 136 in the transponder 112. Capacitor plate 134 is capacitively coupled to a second capacitor plate 138 in the transceiver 114. Plate 138 is connected to suitable receiver amplification and demodulation circuitry 140 whose output is coupled to the machine controller.

Thus, it can be seen that the transceiver-to-transponder transmission link is provided by way of an electromagnetic coupling while the transponder-to-transceiver transmission link is provided by way of a capacitive coupling. This technique has several advantages over some of the other transmission techniques, although it should be understood that such other transmission techniques do fall within the broad teachings of the present invention. For example, if an all "magnetic" system is used that employs a pair of inductors each in the transceiver and transponder, there can be experienced an unacceptable amount of cross coupling of the electromagnetic energy. In other words, the very strong signal from the power coupling coil in the transceiver can couple into the other transceiver coil used to receive the data transmitted by the transponder thereby causing harmful interference which can degrade the system accuracy. Also, since the transponder must be fitted within a small cavity in the tool, the effects on an inductor which is surrounded by steel can be very severe. The steel has the effect of a shorted turn on the inductor which can absorb much of the available power. The capacitive coupling on the other hand, is actually aided by the presence of the steel. Even the optical transmission link described above in connection with the first embodiment of the present invention has certain drawbacks in that it may be susceptible to dirt and other debris which is often encountered in the adverse machine tool environment which could degrade the optical transmission link. In addition, it appears necessary that the transceiver and transponder be properly oriented in order to establish the appropriate communication link when optical coupling is used. In contrast, the combination electromagnetic-capacitive coupling technique overcomes these problems at very little additional expense, if any.

The mechanical construction of the transceiver 114 of this embodiment is illustrated in FIG. 9. Transceiver of read/write head preferably takes the form of a plastic outer shell 142 having capacitor plate 138 located on one end thereof transverse to the major axis of the shell 142. The capacitor plates used in this embodiment can conveniently comprise a thin metallic coating on conventional printed circuit board material, although other constructions can be used. Located internally of shell 142 is an inductor generally designated by the numeral 126 that includes winding 148 wound about a ferrite core 150. A shielded 3-wire cable 152 has two of its wires connected to opposite ends of winding 148, with the other wire being connected to the capacitor plate 138. The shield 151 of cable 152 is physically connected to a metallic part of machine 100 which serves as a reference ground for the electric components of both the transceiver and transponder. The internal components within shell 142 can be conveniently potted with a suitable material such as nonconductive epoxy.

The transponder 112 construction is shown in FIG. 10. It also employs a plastic outer shell 156 which forms a housing for all of the transponder components which includes capacitor plate 134, inductor 130 with its winding 158 and core 160. Winding 158 and capacitor plate 134 are suitably connected to a printed circuit board 162 containing other electronic components for the transponder. Preferably, these components will take the form of a custom integrated circuit chip in order to achieve the desired miniaturization.

The electrical components within transponder 112 should be referenced to the same reference potential as the components in the transceiver 114. This may be accomplished in several different ways. In the embodiment shown in FIG. 10 there is provided another plate 164 adjacent the opposite face of the transponder shell 156 which is coupled to the electronic components on the board 162. When the transponder 112 is mounted in the tool adapter 106, then the plate 164 will either make physical connection with the metal adapter or will be sufficiently capacitively coupled thereto so that the components in the transponder are referenced to the machine potential. This is because the tool adapter 106 is physically connected to the machine tool 100 when it is held in the tool magazine 102. The transceiver 114 components are referenced to the same potential by way of the cable shield 151 which is connected to the machine 100 as well, as described above.

The degree of capacitive coupling between transceiver plate 138 and transponder plate 134 is a function of the area of the plates and the distance therebetween. These dimensions can be varied according to well established capacitive principles. However, a plate size of ½ centimeter square for plates 134 and 138 has provided sufficient capacitive coupling even when the plates are spaced apart a distance of about a foot. This amount of spacing is probably not going to be usually required. However, it can be appreciated that two-way communication can be established between the transceiver 114 and transponder 112 that does not require precise orientation therebetween or any physical contact. This is very desirable in the environment which these devices find particular utility.

Figure 12:
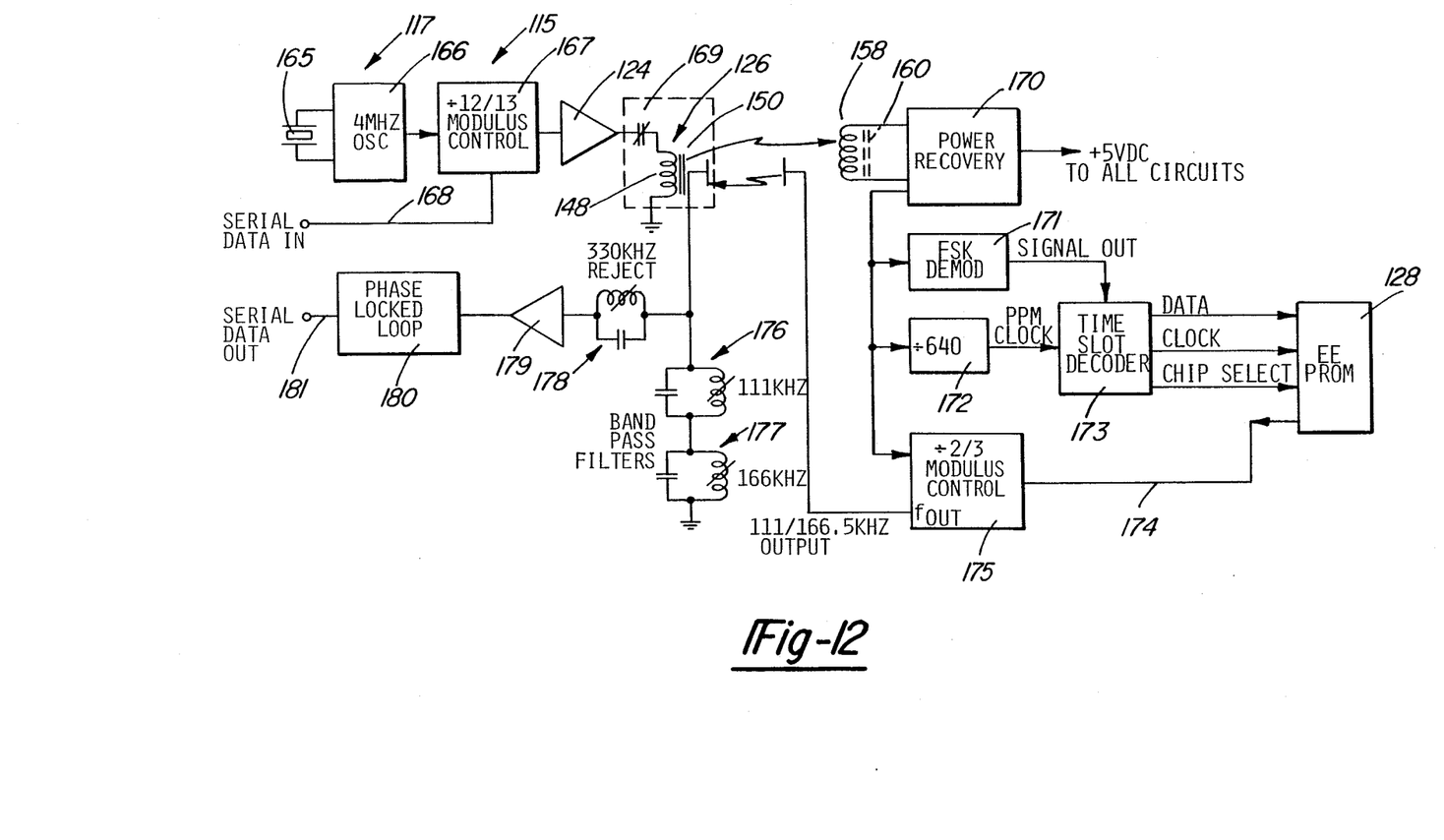
FIG. 12 is a block diagram of the electrical circuitry of the transceiver and transponder made in accordance with one embodiment of this invention.

FIG. 12 provides a more detailed functional block diagram for the transceiver and transponder circuitry. By way of a specific example, oscillator 117 includes a crystal 165 driving an oscillator network 166 at about a 4 megahertz frequency. Oscillator 166 amplifies this signal and couples it to an input of a frequency shift keying (FSK) generator 167 serving as a modulator 115. Briefly, FSK generator 167 operates as a divider which divides the output of oscillator 166 by one of two different numbers depending upon whether the signal level on line 168 coupled to the modulus control input is at a logical high (a "1") or a logical low (a "0"). In this embodiment, the output of generator 167 will either be at a frequency of 307 kilohertz or 333 kilohertz resulting from the division of the oscillator frequency by the number 12 or 13 depending upon the "data in" signal levels on line 168. The data in signal levels are chosen to provide the necessary data signals to operate the transponder circuitry, in particular, memory 128. Consequently, the data in signals need to provide clock signals, chip select signals and the appropriate operational codes to read or write or erase data within the memory. This is all accomplished by providing the appropriate signal levels on line 168 at the appropriate time slot. The thus modulated output of FSK generator 167 is amplified by amplifier 124 and coupled to a tuned tank circuit employing variable capacitor 169 and inductor coil 148. As a result, the inductor 148 transmits electromagnetic energy having sufficient energy content to power the transponder components and also sufficient data encoded therein in order to operate these components.

The electromagnetic energy transmitted from transceiver 114 induces electrical current in coil 158 in the transponder. The energy is recovered by a power recovery circuit 170 and rectified to provide a +5 volt DC signal level to power the transponder components. The data in the encoded electromagnetic signal is demodulated by a frequency shift keying demodulator network 171. The particular type of memory 128 used in this embodiment requires three different operational signals in order to function properly. These operational signals are labeled in FIG. 12 as data, clock and chip select signals. As known in the art, the clock and chip select signals must occur at appropriate time periods whereas the information content on the data line provides op codes that command certain operations from the memory such as read, write or erase functions. Since there is only one communication link from the transceiver 114 (i.e. the electromagnetic coupling via inductor coils 148 and 158) it becomes necessary to decode the data previously encoded in the electromagnetic transmission to provide the three separate operational signals for the memory 128. In FIG. 12, this decoding function is represented by a counter 172 that supplies pulse position modulation (PPM) clock pulses (T1, T2) to a time slot decoder 173. The decoding scheme used in this particular embodiment will be described in more detail in connection with FIGS. 13 and 14. Suffice it to say that the encoded information is decoded and coupled to the memory 128 as necessary to control the desired functions thereof.

Assuming that an appropriate read command is received by the transponder, the memory 128 provides a series of ones and zeros depending upon its data content on line 174 which is coupled to the modulus control input of a divider 175. When it is desired to read the contents from the transponder memory, the frequency of the electromagnetic energy from the transceiver is at a fixed frequency, here, 330 kilohertz. In other words, no new data is being encoded into the transmitted signal from the transceiver. This 330 kilohertz "carrier" signal is divided by a given number in counter 175 depending upon whether the data on line 174 is a logical 1 or logical 0. In this particular embodiment, divider 175 divides by the numbers 2 or 3 thereby providing an output frequency coupled to capacitor plate 134 of 111 or 166.5 kilohertz.

Thus, an electrostatic signal oscillating at one of two different frequencies is generated at capacitor plate 134. This electrostatic signal is capacitively coupled through air which serves as a dielectric to the capacitor plate 138 in the transceiver. Suitable bandpass filters 176 and 177 in the transceiver are used to tune the transceiver to receive signals oscillating at the 111 or 166.5 frequency ranges while filtering out extraneous frequencies. Although not absolutely necessary, a tuned circuit 178 can be utilized to reject signals bearing a frequency (here, 333 KHz) corresponding to that being generated electromagnetically over the coil 148 during the time transceiver 114 is receiving data. The net result is that signals bearing one of the two frequencies will be amplified by a suitable amplification network 179 which is fed into an FSK demodulator network utilizing a phase locked loop circuit 180. As known in the art, phase locked loop (PLL) circuits can be used to lock in to a particular frequency and provide a digital output in response thereto. Thus, the output of PLL 180 is the recreation of the information or data being read from the memory 128. The output line 181 can be suitably coupled to the controller of the automated machine tool 100 to take appropriate action in response to the data having been read from the particular tool that is about to be loaded into the machine.

Figure 13:
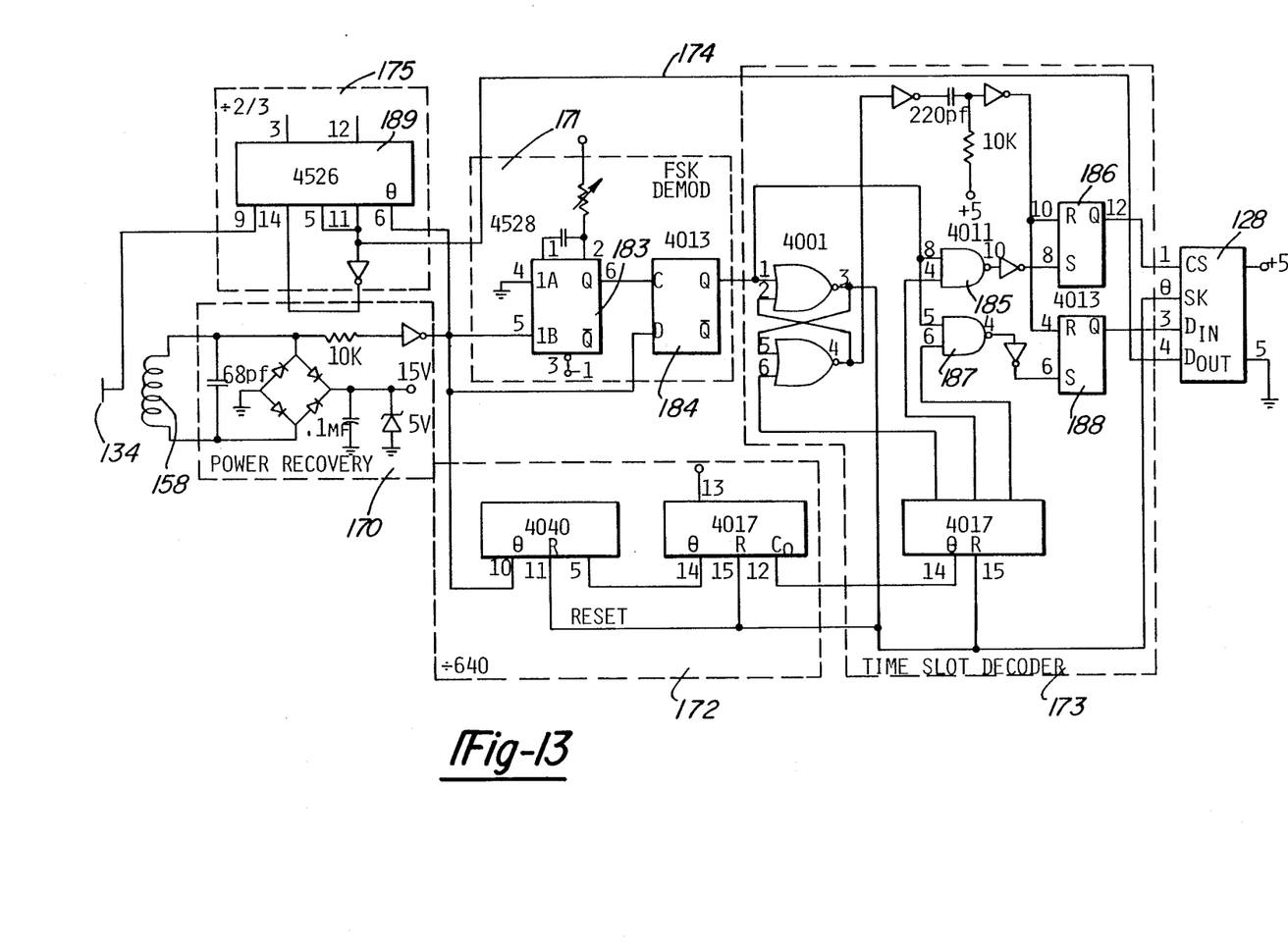
FIG. 13 is a detailed schematic diagram of the transponder circuitry made in accordance with one embodiment of this invention.

A detailed schematic diagram of the transponder circuitry is illustrated in FIG. 13. The individual components performing the functions of the functional block discussed in connection with FIG. 12 have been encompassed by a dotted line which bears the corresponding reference numeral as the functional block. The components therein have been labeled with industry standard component numbers and pin numbers known in the art. In this particular embodiment, the components are available from Motorola, Inc. Consequently, it is believed that this figure is essentially self-explanatory especially when taken in conjunction with the previous description so that a person of ordinary skill in the art can readily implement this circuit without undue experimentation. Consequently, a component by component description is not necessary keeping with the desirability of maintaining the specification as clear and concise as possible.

Figure 14:
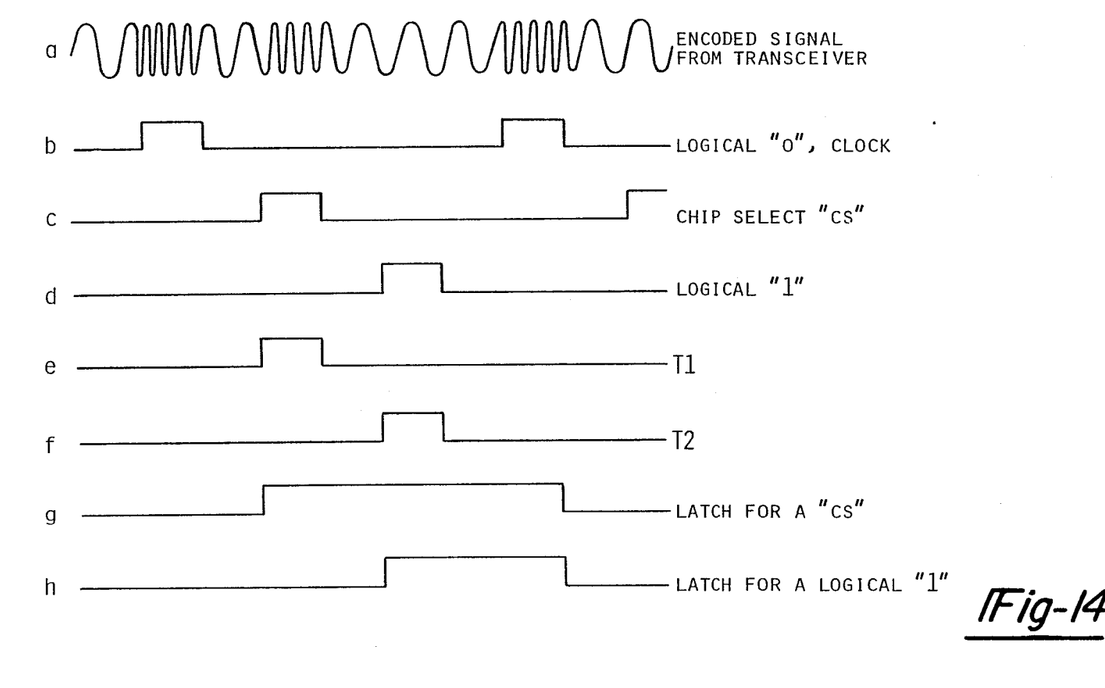
FIG. 14 comprises a series of waveforms helpful in understanding the decoding function in the transponder.

Reference to the waveform shown in FIG. 14 will help in understanding the detailed operation of the preferred embodiment of the present invention, especially the decoding function. Assume, for example, that the machine controller generates data in signals on line 168 (FIG. 12) to modulate the reference oscillating signal so that the transceiver 114 transmits an electromagnetic signal having the frequency characteristics represented in FIG. 14(a). The electromagnetic energy is rectified by a diode bridge network, filtered and regulated by zener diode to provide a +5 volt DC reference to the internal electronic components in the transponder. The signal from the transceiver is also coupled through a shaper device 182 for the purpose of squaring up the rounded input waveforms. The output of shaper 182 is coupled into an input of a one shot multivibrator 183. The Q output of flip flop 184 will go high whenever a 333 kilohertz signal is received. However, the logical high level at the output of flip flop 184 needs to be decoded into three different control signals for the memory 128; namely, clock signals, chip select signals or data signals. To this end, a pulse position modulation technique is used to decode the information. Time slot decoder 173 in conjunction with divider counter 172 provides discrete time slots labeled T1 and T2 in FIG. 14(e) and 14(f), respectively. To generate a chip select signal, the transceiver microprocessor causes a 333 kilohertz signal to be modulated during the appropriate time period within the time slot defined by T1. This will set NAND gate 185 which is latched into latch 186 (as illustrated in FIG. 14(g)) so that the chip select signal can be loaded into the memory 128 at the next clock pulse. The clock pulses are generated at appropriately timed intervals which happen repetitively regardless of whether it is necessary to produce a chip select or logical 1 data signal. In other words, the transceiver and transponder "idle" such that a pulse train shown in FIG. 14(b) is automatically produced during operation. This is how the clock pulses are generated for the memory 128. If it is desired to transmit a logical 1 data signal, the transceiver controller modulates the electromagnetic signal (not shown in FIG. 14(a)) so that it will produce a 333 kilohertz signal at the time slot T2. In such case, the NAND gate 187 will go high (FIG. 14(d)) which is latched into latch 188 (as illustrated in FIG. 14(b)) for loading into the memory 128 on the next clock pulse. On the other hand, if there are no logical high outputs from flip flop 184 during time slots T1 or T2 then the memory 128 interprets this as a logical zero data signal. Thus, it can be seen that all of the necessary control signals for operating the memory 128 have been provided even though only one communication link is used.

Assuming that a read command is generated, the memory 128 provides a serial bit output stream to the modulus control input of counter 189 making up the divider network 175. During a memory read cycle the transceiver frequency remains at a substantially constant 333 kilohertz rate. This frequency is divided by counter 189 by the number 2 or 3 depending upon whether the data out signal levels from the memory are at a logical high or logical low level. For example, if the data bit is a logical 1 level the divider 189 will provide an output of 166.5 kilohertz whereas if the logical level is a zero then the output frequency would be at 111 kilohertz. This output signal is connected to capacitor plate 134 which, as noted above, is capacitively coupled to transceiver plate 138 for receiving the electrostatically generated signal.

Thus, two-way communication is established between the transceiver and transponder in a manner that makes efficient use of the two communication links while at the same time providing a highly accurate and easy to use identification system. Various modifications of the embodiments disclosed in the foregoing specification will become apparent to one skilled in the art upon a study of the specification and following claims.

What is claimed is:

1. A method comprising:

mounting a transponder in a tool, said transponder including a read/write memory having a unique identification code stored therein, the memory requiring clock, chip select, and data operation signals to be applied thereto for proper operation;

placing said tool in a temporary storage device;

wirelessly transmitting from a transceiver an encoded waveform containing sufficient power and encoded operation signals to the transponder to power and operate the memory, the waveform always at least including a repetitively generated clock code impressed therein;

using the clock code impressed in the waveform received by the transponder to define a plurality of time slots;

sensing the waveform during said time slots for the presence of codes associated with said chip select and data signals;

applying decoded chip select, clock and data signals to the memory to read the identification code therein;

transmitting the identification code from the memory in the transponder to the transceiver;

comparing the identification code with preselected information; and loading said tool into a machine for performing operations on a workpiece as a result of said comparison.

2. The method of claim 1 which further comprises:

removing the tool from the machine after it has performed operations on the workpiece;

using the transceiver to electromagnetically transmit sufficient power and operation signals to write information into the transponder memory; and returning the tool to the storage device.

3. The method of claim 2 wherein said information written into the memory is a function of the expected remaining useful life of the tool.

4. The method of claim 1 wherein information relating to the maximum feed rate for the tool is also contained within said memory.

5. The method of claim 1 wherein the maximum speed for the tool is also programmed into said memory.

6. The method of claim 1 wherein said waveform is encoded by selectively shifting the frequency of a reference signal at given time periods, and wherein said identification code is defined by dividing a given frequency of the received waveform by given numbers depending upon the logical level of the information contained within the memory.

7. The method of claim 1 wherein the encoded waveform from the transceiver is in the form of electromagnetic energy; and wherein the identification code transmitted from the memory in the transponder is in the form of electrostatic energy.

8. The method of claim 7 wherein said transponder is mounted in an adapter portion of a machine tool; and wherein said transceiver is mounted on a tool magazine which holds a plurality of different tools.

9. The method of claim 8 wherein said transponder is implanted into the tool adapter so that electronic components in the transponder are referenced to the same electrical potential as electrical components in the transceiver.

10. The method of claim 1 wherein said waveform is encoded by periodically shifting the frequency of a reference signal to generate first and second clock signals;

wherein said chip select signal is encoded in the waveform by additionally shifting the reference frequency during a first preselected time slot between the first and second clock signals; and wherein data of a given digital state is defined by additionally shifting the reference frequency during a second time slot between the first and second clock signals, with the absence of a frequency shift in the second time slot defining an opposite digital data state.

11. An identification system comprising a transceiver and a transponder, said transponder including a read-/write memory requiring chip select, clock and data operation signals applied thereto for operating the memory;

said transceiver including oscillator means for generating a reference alternating current signal, modulator means for shifting the frequency of the reference signal in accordance with certain input control signals, said input control signals being adapted to shift the frequency of the reference signal at first and second times to generate first and second clock codes, the modulator means being further adapted to selectively shift the frequency of the reference signal during a first time slot between the first generation of the first and second clock codes thereby defining a chip select code, with the modulator means further being adapted to selectively shift the frequency of the reference signal during a second time slot between the first and second clock codes thereby defining a data code for one digital state; and said transponder including a divider means responsive to the generation of said clock codes to generate first and second time slots, said transponder further including decoder means for detecting the presence of the shifted frequency at said first time slot to thereby decode the chip select signal from the waveform, said decoder means being further adapted to detect the shifted frequency of the waveform during said second time slot to thereby decode data of said one digital state; and said transponder further including means for supplying decoded clock, data and chip select signals to said memory to control the operation thereof.

* * * * *